United States Patent [19]

Fujisawa

[11] Patent Number: 4,578,029
[45] Date of Patent: Mar. 25, 1986

[54] METHOD FOR DRIVING A ROTARY KILN FOR ROASTING CEMENT RAW MEALS

[75] Inventor: Tetsuo Fujisawa, Kobe, Japan

[73] Assignee: Kabushiki Kaisha Kobe Seiko Sho, Kobe, Japan

[21] Appl. No.: 598,965

[22] Filed: Apr. 11, 1984

[30] Foreign Application Priority Data

Oct. 17, 1983 [JP] —Japan .................. 58-194516

[51] Int. Cl.$^4$ .................. F27B 15/00; F27B 7/02
[52] U.S. Cl. .................. 432/14; 432/106
[58] Field of Search .................. 432/14, 106

[56] References Cited

U.S. PATENT DOCUMENTS

| | | | |
|---|---|---|---|
| 3,116,055 | 12/1963 | Pixley et al. | 432/106 |
| 4,420,302 | 12/1983 | Knudsen | 432/106 |
| 4,435,159 | 3/1984 | Knudsen | 432/106 |

*Primary Examiner*—John J. Camby

*Attorney, Agent, or Firm*—Oblon, Fisher, Spivak, McClelland & Maier

[57] ABSTRACT

A rotary kiln for roasting cement raw meals provided with, on the raw meal inlet side of the kiln, a suspension preheater having a calcining furnace, which includes a kiln body lined with refractory materials, a mechanism for supporting said kiln body with a slight inclination to the horizontal, and a mechanism for rotating the change kiln body around an axis thereof and on the supporting mechanism at a variable speed, wherein the slope of the axis of the kiln body ranges from 1.5% to 3.5% and the maximum rotational speed of said kiln body is in a range represented by the following equation: $N=(0.2 \sim 0.4) \times 42.3/\sqrt{D}$ wherein N is the maximum rotational speed of the kiln body, and D is the inside diameter of refractory materials in the granulating zone of the kiln, thereby improving the granulation of the cement raw meals in the kiln.

3 Claims, 5 Drawing Figures

FIGURE 2
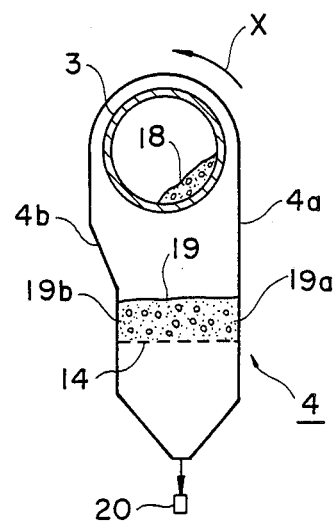
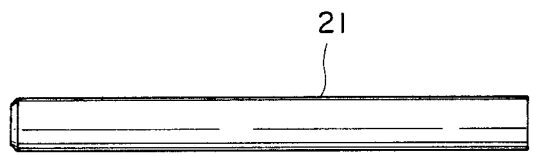
FIGURE 3 (a)
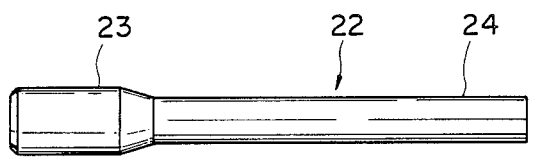
FIGURE 3 (b)
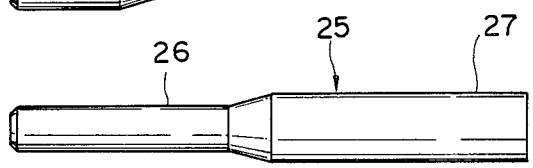
FIGURE 3 (c)

METHOD FOR DRIVING A ROTARY KILN FOR ROASTING CEMENT RAW MEALS

BACKGROUND OF THE INVENTION

1. Field of the Invention

The present invention relates to a rotary kiln for roasting cement raw meals and a method for driving the rotary kiln. More particularly, it relates to a rotary kiln sloped more gently and rotating at a higher speed than conventional rotary kilns provided with, on the raw meal inlet side of the kiln, a suspension preheater having a calcining furnace, thereby improving the granulation of the cement raw meals therein.

2. Description of the Prior Art

FIG. 1 shows an apparatus, for roasting cement raw meals, which comprises a suspension preheater 1 having a vertical calcining furnace 2 connected to staged cyclones $C_1$–$C_4$, a rotary kiln 3 for forming clinker and a cooler 4 for cooling the clinker. In the roasting apparatus, the raw meals A are gradually preheated by a hot gas, proceeding up through the gas duct 7, induced by a waste gas fan 8, as the meals proceed downwards through a series of cyclones $C_1$–$C_3$. (The raw meal flow is indicated by a dotted arrow line and the hot gas flow by a solid arrow line.) The raw meals are then fed into the calcining furnace 2 in which hot gas is introduced from the cooler 4 through a duct 13 and fuel is supplied thereto from a burner 6a to thereby calcine the raw meals. The calcined raw meals enter into the last stage cyclone $C_4$ followed by introduction into the rotary kiln 3 through a transition housing 12 connected to the calcining furnace 2.

To the rotary kiln 3, hot gas from the cooler 4 and fuel from the burner 6b are supplied. While the raw meals are transported from the feed inlet of the rotary kiln 3 to the outlet, they are roasted into clinker at an elevated temperature in the rotary kiln 3. The resulting clinker is discharged from the kiln 3 to the cooler 4 in which while the clinker is carried on a lattice 14 it is cooled by cold air supplied thereto by a blower 10 and crushed by a crusher 15 and then carried out by means of a conveyor 16 or the like. The surplus air in the cooler 4 is drawn through a dust collector 17 by means of an induced draft fan 9 to separate the fine clinker dust from the surplus air which is combined with the product clinker.

The rotary kiln 3, being lined with refractory materials, is supported with a slight inclination to the horizontal by a supporting means (not shown) and rotates around its axis by a driving means (not shown).

The grain size of the clinker formed in the rotary kiln 3 varies widely ranging from massive chunks of clinker to fine powder-like clinker. These sizes of clinker are unevenly distributed and thermal hysterisis is unevenly applied during the cascading motion in the kiln. The massive chunks of clinker tend to be excessively roasted on its outer surface, but tend to be insufficiently roasted in the center of the chunks. The fine powder-like clinker tends to be insufficiently roasted as well. Thus, these clinkers are unevenly roasted as a whole.

Further, when the clinkers are supplied from the rotary kiln 3 to the cooler 4, as shown in FIG. 2, they tend to be segregated according to their grain size when discharged to the cooler 4 due to the cascading motion within the rotary kiln 3 rotating in the direction of the arrow mark thereby accumulating in layers on the lattice 14 with the fine clinker 19a distributed at the side wall 4a of the cooler 4. The segregated fine clinker is transported in the longitudinal direction to form a strip-like fine clinker layer 19a on the lattice 14 along the side wall 4a.

In the area from the center to the other side wall 4b, a grained clinker layer 19b comprised of larger and coarser grains of clinker is formed, which is easily cooled due to the fact that a large amount of cooling air can pass through the layer consisting of such coarse grains. The fine clinker layer 19a however is insufficiently cooled due to the fact that the individual particle size is so fine that enough cooling air can not pass through such a layer. In addition, the fine clinker tends to be fluidized to flow in the direction to the outlet of the cooler 4 by the cooling air passing therethrough, resulting in the formation of a fine and hot clinker flow which is known as "Red River". This flow reduces a cooling efficiency of the cooler 4, raises the temperature of the clinker discharged from the cooler 4, increases fuel consumption in the roasting process, and damages the lattice 14 and the side wall of the cooler 4 by overheating them. Reference number 20 indicates a conveyor for transporting the finest of this powder-like clinker which falls from the apertures of the lattice 14. On the contrary, even when the massive chunks of clinker arrive at the oultet of the cooler, the interior is still red-hot so that when these large chunks are crushed by the crusher 15 the hot clinker becomes mixed with the cooled clinker, resulting in raising the average temperature of the product clinker.

As mentioned above, both the massive chunks of clinker and the fine powder-like clinker have an undesirable effect on the cooling efficiency and a thermal recovery of the cooler. For example, the nonuniform roasting and the insufficient cooling in the roasting process lead to a decrease in the grinding capacity and an increase in the grinding energy consumption in the succeeding cement grinding process. Thus, it is important to form clinker having a grain size of as narrow a distribution as possible in the rotary kiln, reducing the amount of the massive chunks and the fine powder-like clinker as much as possible.

However, the conventional rotary kiln provided with, to the raw meal inlet side of the kiln, a suspension preheater with a calcining furnace is designed in view of heat transmission alone without taking account of the function of granulating the raw meals therein. The slope and the rotational speed of the rotary kiln are selected so as to maintain a proper residence time of the clinker in the rotary kiln to receive a required heat from hot gas. Generally, the slope of such a conventional rotary kiln is in the range of approximately 3.5% to 4% and the rotation speed is in the range of 2.5 rpm; to 3.5 rpm; at a maximum. It is believed that power consumption and the life of the rotation parts of the kiln are shortened if the slope become more gentle and at the same time the rotational speed becomes greater than the aforementioned.

SUMMARY OF THE INVENTION

This invention was completed based on new knowledge, refuting the conventional concept for designing the rotary kiln, that when the rotational speed of the kiln is maintained at a high level suitable for granulating the raw meals in the kiln, variation in the granulated clinker size is reduced allowing for a more even distribution of the grain product size thereby forming a grained clinker having a relatively uniform size.

The rotary kiln for roasting cement raw meals of this invention, which overcomes the above-discussed and numerous other drawbacks and deficiencies of the prior art, relates to a rotary kiln provided with, on the raw meal inlet side of the kiln, a suspension preheater having a calcining furnace, said rotary kiln including: a kiln body lined with refractory materials, supporting means for said kiln body with a slight inclination to the horizontal, and rotating means for rotating said kiln body around its axis and on said supporting means at a variable speed, wherein the slope of the axis of the said kiln body ranges from 1.5% to 3.5% and a maximum rotational speed of said kiln body is in a range represented by the following equation:

$$N = (0.2-0.4) \times 42.3/\sqrt{D}$$

wherein N is the maximum rotational speed of the kiln body, and D is the inside diameter of the refractory materials at the granulating zone of the kiln.

The slope normally ranges from 2% to 3%. The maximum rotational speed of the kiln body is in a range represented by the following equation:

$$N = (0.2-0.3) \times 42.3/\sqrt{D}$$

The method for driving the rotary kiln of this invention is characterized in that the slope of said kiln body ranges from 1.5% to 3.5% and said kiln body is driven with a number of rotations in a range represented by the following equation:

$$N = (0.2 \sim 0.4) \times 32.3/\sqrt{D}$$

wherein N is the number of rotations of the kiln body and D is the inside diameter of the refractory materials at the granulating zone of the kiln.

The slope normally ranges from 2% to 3%. Preferable the number of rotations of the kiln body is in a range represented by the following equation:

$$N = (0.2-0.3) \times 42.3/\sqrt{D}$$

Thus, the invention described herein makes possible the objects of (a) providing a rotary kiln for roasting cement raw meals which prompts the growth of granulation clinker therein with a formation of the grained clinker having a relatively uniform size; (b) providing a rotary kiln which forms a homogeneous quality of clinker; (c) providing a rotary kiln which attains an improved cooling efficiency because cooling air passing through the clinker layer flows uniformly; (d) providing a rotary kiln which effectively cools the clinker products thereby increasing the grinding capacity and reducing the grinding power consumption in the succeeding cement grinding process; (e) providing a rotary kiln which improves the quality of the final cement product by lowering its temperature; (f) providing a rotary kiln which makes little "Red-River" thereby preventing it from damaging the lattice and the side wall of the cooler by overheating; (g) providing a rotary kiln which lengthens the life of the refractory materials used as a lining on the inside of the kiln because the maximum temperature of the refractory materials is reduced due to the faster rotational speed of the kiln; and (h) providing a method for driving the rotary kiln.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2 is a cross sectional view taken along line II—II in FIG. 1.

FIGS. 3(a), (b) and (c) are side views of a rotary kiln, respectively.

DETAILED DESCRIPTION OF THE PREFERRED EMBODIMENTS

Figure 1:
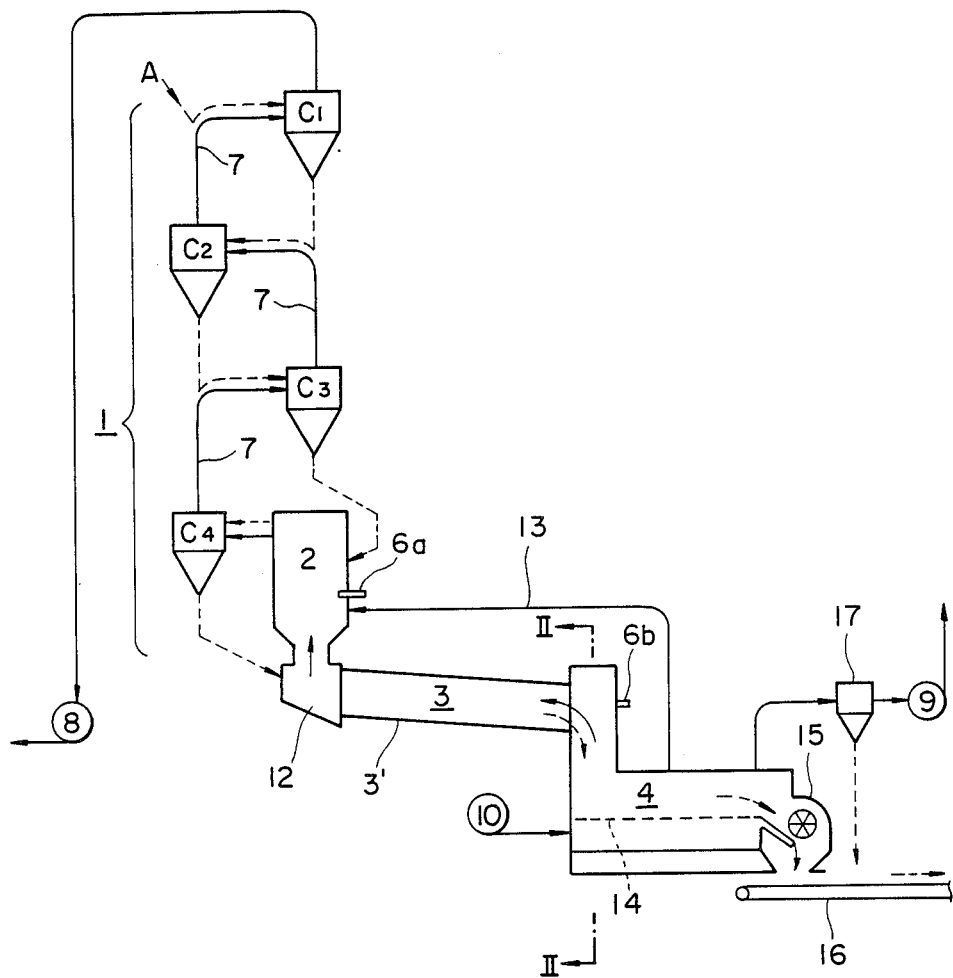
FIG. 1 is a diagram showing an apparatus for roasting cement raw meals including a rotary kiln wherein a suspension preheater, having a calcining furnace, is installed at the raw meal inlet side of the kiln.

The area from the middle part to the outlet of the rotary kiln 3 can be considered to be a granulator.

A reasonable rotational speed of the granulator is represented by a relationship with the critical rotational speed $42.3/\sqrt{D}$ (rpm), wherein D is the effective diameter of the granulator body.

The rotational speed of the conventional rotary kiln provided with a suspension preheater, having a calcining furnace is $(0.10-0.15) \times 42.3/\sqrt{D}$, which is too low to attain enough granulating function, resulting in the clinker produced being of uneven size.

The maximum rotational speed of the rotary kiln depends upon the degree of the improvement for the granulation of the cement raw meals in the kiln. An excessive rotational speed is only powerconsuming. Thus, the maximum rotational speed of the rotary kiln, according to this invention, ranges from 20% to 40%, preferably 20% to 30%, of the critical rotational speed. The maximum rotational speed N is thus in a range represented by the following equation:

$$N = (0.2-0.4) \times 42.3/\sqrt{D}$$

A more preferable rotation speed N is in a range represented by the following equation:

$$N = (0.2-0.3) \times 42.3/\sqrt{D}$$

Therefore, for a kiln having a diameter D=4 meters, the rotational speed should be between 4.23 rpm and 8.46 rpm.

A reasonable slope of the rotary kiln should be determined taking the residence time of the raw meals in the kiln into account at a certain rotation speed. According to this invention, it ranges from 1.5% to 3.5%, preferably 2% to 3% based on a speed of 20% to 40% of the critical rotation speed of the kiln.

The gentle slope of the axis and the high speed of the rotary kiln 3 provided with a suspension preheater having a calcining furnace results in the particular advantageous roasting of the raw meals due to the following reasons:

The raw meals fed into the kiln are roasted with such high efficiency that the treating capacity per volume in the kiln is improved and the transportation speed thereof in the direction of the kiln axis can be increased.

In the kiln, compounds such as ferrous components, having a relatively low melting point, contained in the raw meals form a liquid, on the basis of which seeds are formed and grow into grains with the formation of granulating zone while the raw meals are transported to the roasting zone. In the kiln with such a high transportation speed of the raw meals, the resulting granulating zone tends to be long. The granulating agent such as a ferrous component is consumed in the upstream portion of the granulating zone, so that the siliceous components in the raw meals tend to remain in the downstream portion of the granulating zone thereby making effective granulation difficult. Thus, when granulation is carried out within as short area as possible in the direction of the kiln axis, the clinker can be formed in a uniform grain size. In order to shorten the granulating zone in the direction of the kiln axis, it is advantageous to set the inclination of the axis at a slightly smaller angle to the horizontal than the conventional rotary kiln and to increase the rotation speed to a speed greater than that normaly used by a conventional kiln. Therefore, in this kiln having a slightly smaller inclination to the horizontal and a higher rotation speed as prescribed by this invention, the amount of cascading motion in a given area increases thereby attaining improved and effective granulation.

The inner diameter D of the kiln 3 is determined by the inner diameter of the lining refractory materials of the straight kiln body 21 shown in FIG. 3(a), by the inner diameter of the kiln body 24 including the granulating zone shown in FIG. 3(b), which is provided with an expanded body 23, at the inlet side of the rotary kiln 22, and by the inner diameter of the kiln body 27 including the granulating zone shown in FIG. 3(c), which is provided with an expanded body 27 at the outlet side serving to reduce the thermal loading in the roasting zone of the rotary kiln 25. When a rotary kiln consisting axially of a plurality of rotatable sections is used, a section or sections including a granulating zone may be rotated at a high speed according to this invention.

It is understood that various other modifications will be apparent to and can be readily made by those skilled in the art without departing from the scope and spirit of this invention. Accordingly, it is not intended that the scope of the claims appended hereto be limited to the description as set forth herein, but rather than the claims be construed as encompassing all the features of patentable novelty which reside in the present invention, including all features which would be treated as equivalents thereof by those skilled in the art to which this invention pertains.

What is claimed as new and desired to be secured by Letters Patent of the United States is:

1. A method for driving a rotary kiln for roasting cement raw meals and producing clinker of a more uniform size, said kiln being provided with a clinker inlet communicating a suspension preheater having a calcining furnace and a raw meal outlet spaced from said inlet along the axis of rotation of said kiln, comprising the steps of:
   orienting said kiln body with a downward slope towards said outlet, said slope being in a range from 1.5% to 3.5%; and
   shortening a granulating zone of said kiln by driving said kiln body with a number of rotations in a range represented by the following equation:

$$N = (0.2 - 0.4) \times 42.3 / \sqrt{D}$$

wherein N is the number of rotations of the kiln body in revolutions per minute and D is the inside diameter in meters of refractory materials in a granulating zone of the kiln, wherein said slope is selected as a function of a desired residence time of said raw meals in said kiln and of said number of rotations,
   wherein said kiln having said shortened granulating zone produces clinker of more uniform size.

2. A method according to claim 1, wherein said slope ranges from 2% to 3%.

3. A method according to claim 1, wherein said number of rotations of the kiln body is in a range represented by the following equation:

$$N = (0.2 - 0.3) \times 42.3 / \sqrt{D}.$$

* * * * *

UNITED STATES PATENT AND TRADEMARK OFFICE
CERTIFICATE OF CORRECTION

PATENT NO. : 4,578,029
DATED : Mar. 25, 1986
INVENTOR(S) : Tetsuo Fujisawa

It is certified that error appears in the above-identified patent and that said Letters Patent is hereby corrected as shown below:

In the ABSTRACT, line 6, delete "change".

Col. 2, line 56, change "that power consumption" to --to be power consuming--; and line 57, change "are" to --is--.

Col. 3, line 18, please correct the formula as follows:

$$N=(0.2\sim0.4)\times42.3/\sqrt{D}$$

Col. 3, line 36, in the formula, change "32.3" to --42.3--.

Col. 4, line 27, change "42.3/$\sqrt{D}$" to --42.3.3/$\sqrt{D}$--; and line 31, change "42.3/$\sqrt{D}$" to --42.3/$\sqrt{D}$--.

Col. 6, Claim 1, line 3, change "clinker" to --raw meal-- and line 5, change "raw meal" to --clinker--.

Signed and Sealed this

Twenty-fourth Day of March, 1987

Attest:

DONALD J. QUIGG

Attesting Officer

Commissioner of Patents and Trademarks